(12) United States Patent
Iwamoto et al.

(10) Patent No.: US 7,083,877 B2
(45) Date of Patent: Aug. 1, 2006

(54) ALL SOLID STATE BATTERY WITH COATED SUBSTRATE

(75) Inventors: Kazuya Iwamoto, Sakai (JP); Shuji Ito, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 335 days.

(21) Appl. No.: 10/458,372

(22) Filed: Jun. 11, 2003

(65) Prior Publication Data
US 2003/0232248 A1  Dec. 18, 2003

(30) Foreign Application Priority Data
Jun. 13, 2002  (JP)  ............... 2002-173349

(51) Int. Cl.
H01M 4/64  (2006.01)
H01M 4/80  (2006.01)
(52) U.S. Cl. .............. 429/233; 429/236; 429/237
(58) Field of Classification Search .............. 429/233, 429/236, 237
See application file for complete search history.

(56) References Cited
U.S. PATENT DOCUMENTS
5,141,614 A    8/1992  Akridge et al.
5,338,625 A    8/1994  Bates et al.
5,547,782 A *  8/1996  Dasgupta et al. ............ 429/322
5,989,741 A * 11/1999  Bloomfield et al. .......... 429/32
6,168,884 B1 * 1/2001  Neudecker et al. ......... 429/162
6,280,875 B1   8/2001  Kwak et al.

FOREIGN PATENT DOCUMENTS
JP    60-257073    12/1985
JP    61-165965    7/1986
JP     8-64213     3/1996
JP    10-247516    9/1998
JP    2000-251939  9/2000

* cited by examiner

Primary Examiner—Dah-Wei Yuan
(74) Attorney, Agent, or Firm—McDermott Will & Emery LLP (57) ABSTRACT

An all solid state battery comprising: (a) a positive electrode current collector layer, (b) a positive electrode active material layer carried on the positive electrode current collector layer, (c) a negative electrode current collector layer, (d) a negative electrode active material layer carried on the negative electrode current collector layer, (e) a solid electrolyte layer interposed between the positive and negative electrode active material layers, and (f) a substrate carrying either of the positive and negative electrode current collector layers, the substrate comprising a metal sheet and a coating layer covering the surface of the metal sheet, the coating layer comprising at least one metal nitride layer.

10 Claims, 3 Drawing Sheets

ALL SOLID STATE BATTERY WITH COATED SUBSTRATE

BACKGROUND OF THE INVENTION

Electrochemical devices include batteries, capacitors, electrochromic devices, etc. These are ionic devices employing ions as charge carriers. These ionic devices conventionally use a liquid such as water or an organic solvent as the medium that transports ions.

Take batteries as an example of the ionic devices, as devices such as cell phones become more compact and have higher performance these days, there has been an increasing demand for batteries as their power source. In particular, there has been a rapid advancement in the research and development for lithium ion batteries with a higher energy density and the commercialization thereof. However, since a lithium ion battery employs an organic solvent as the medium that transports ions, there is a relatively high possibility of leaking. In addition, since organic solvents are flammable, ignition is likely to occur in the case of leaking. In order to solve these problems regarding reliability of the battery, a study on all solid state lithium batteries has been carried out. For example, Japanese Laid-Open Patent Publication No. 2000-251939 discloses an all solid state battery employing a polymer solid electrolyte, and Japanese Laid-Open Patent Publication No. Sho 60-257073 and Japanese Laid-Open Patent Publication No. Hei 10-247516 disclose all solid state batteries employing an inorganic solid electrolyte.

In recent years, there has been an increasing study on thin film all solid state batteries. As the process of fabricating thin film all solid state batteries, vacuum thin film processes such as sputtering, ion plating and deposition are usually used (U.S. Pat. No. 5,338,625 and U.S. Pat. No. 5,141,614).

In the thin film all solid state batteries disclosed in the above prior art examples, particularly when lithium cobaltate is used as the positive electrode active material, a heat treatment in air or in an oxygen atmosphere is necessary after forming of thin films in order to increase the crystallinity of the active material. Accordingly, the substrate is usually made of highly heat-resistant quartz, alumina, silicon wafer, sapphire, etc. The substrates made of these materials, however, are thick and rigid. Since the energy density of battery is influenced by the volume, when a thin film battery with a small area is constructed, the percentage of the substrate in the battery is increased, rendering it difficult to ensure sufficient energy density.

In order to solve the problems described above and to develop the batteries with a high capacity and voltage, Japanese Laid-Open Patent Publication No. Sho 61-165965 proposes to form a plurality of solid electrolyte batteries on one substrate by patterning using a mask and to connect the plurality of solid electrolyte batteries in series or parallel.

Japanese Laid-Open Patent Publication No. Hei 8-64213 proposes to fabricate a thin battery comprising facing positive and negative electrode current collectors, which serve as jacket and accommodate a positive electrode active material, a solid electrolyte and a negative electrode active material interposed between the positive and negative electrode current collectors; to adhere the facing peripheries of the current collectors with a thermally adherent resin frame; and to integrate a plurality of the thin batteries by adhering the extended portions of the frame.

Furthermore, in order to use low-cost metal plates as the substrate since quartz, alumina, silicon wafer and sapphire are costly, U.S. Pat. No. 6,280,875 proposes to cover a metal plate with a metal oxide such as titanium oxide or zirconium oxide to protect the substrate from oxygen.

However, it is difficult to form a metal oxide layer, which is sufficient enough to protect the substrate from oxygen, at high temperatures of 600 to 1000° C. necessary to increase the crystallinity of the positive electrode active material.

Generally, metal oxides have an oxide ion conductivity. The higher the temperature increases, the more oxide ions a metal oxide conducts. For example, if a trace amount of $Y_2O_3$, CaO or $Gd_2O_3$ is added to $ZrO_2$, the oxide ion conductivity will be about $10^{-3}$ to $10^{-2}$ S/cm. Accordingly, even if the substrate is covered with a metal oxide layer in order to protect the substrate, oxygen will reach the substrate during annealing of the positive electrode active material at a high temperature. If the substrate is made of an easily-oxidized material such as copper, the substrate will be oxidized and become brittle, rendering it difficult for the substrate to maintain its shape.

BRIEF SUMMARY OF THE INVENTION

The present invention relates to an all solid state battery comprising: (a) a positive electrode current collector layer, (b) a positive electrode active material layer carried on the positive electrode current collector layer, (c) a negative electrode current collector layer, (d) a negative electrode active material layer carried on the negative electrode current collector layer, (e) a solid electrolyte layer interposed between the positive and negative electrode active material layers, and (f) a substrate carrying either of the positive and negative electrode current collector layers, the substrate comprising a metal sheet and a coating layer covering the surface of the metal sheet, the coating layer comprising at least one metal nitride layer.

The coating layer may further comprise at least one metal oxide layer in addition to the metal nitride layer.

The coating layer may further comprise at least one metal oxynitride layer in addition to the metal nitride layer.

The coating layer may further comprise at least one metal oxide layer and at least one metal oxynitride layer in addition to the metal nitride layer.

The metal nitride layer preferably comprises at least one selected from the group consisting of titanium nitride, aluminum nitride, silicon nitride, boron nitride and zirconium nitride.

The metal oxide layer preferably comprises at least one selected from the group consisting of silicon oxide, titanium oxide, beryllium oxide, aluminum oxide and zirconium oxide.

The metal oxynitride layer preferably comprises at least one selected from the group consisting of aluminum oxynitride, silicon oxynitride and zirconium oxynitride.

The metal sheet preferably comprises copper, nickel, iron, a copper alloy, a nickel alloy, an iron alloy or a stainless steel.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention relates to all solid state batteries and more particularly to a thin film all solid state battery produced by a method having a step of heating a substrate in an oxidizing atmosphere at a high temperature.

The main feature of the present invention is to provide the surface of a substrate with a coating layer comprising at least one metal nitride layer without oxide ion conductivity but with excellent high temperature stability in order to protect the substrate. The metal nitride layer reduces the oxygen permeability of the coating layer and prevents the embrittlement of the substrate caused by oxidation.

The substrate on which the coating layer is carried is made of a metal sheet. The metal sheet may be a metal foil or plate. In order to increase the energy density of the all solid state battery, the metal sheet preferably has a small thickness; specifically, 0.5 to 300 μm.

The metal sheet is preferably made of copper, nickel, iron, alloys containing them or stainless steel. In particular, a copper foil and a stainless steel foil are preferably used.

Preferred examples of metal nitride which forms the metal nitride layer include titanium nitride, aluminum nitride, silicon nitride, boron nitride, zirconium nitride, niobium nitride, tantalum nitride, vanadium nitride, etc. They may be used singly or in combination of two or more. They may be partially reacted with other elements in the metal nitride layer to synthesize another compound or alloy. Among them, preferred are titanium nitride, aluminum nitride, silicon nitride, boron nitride and zirconium nitride because they have excellent stability particularly at high temperatures.

The metal nitride layer preferably has a thickness of 0.1 to 5 μm. If the thickness is too thin, the embrittlement of the substrate caused by oxidation will not be prevented effectively. On the other hand, if the thickness is too thick, the energy density of the battery will be small.

The coating layer comprising only a metal nitride layer prevents the embrittlement of the substrate caused by oxidation; however, the coating layer preferably comprises the combination of a metal nitride layer and at least one of a metal oxide layer and a metal oxynitride layer.

The combination of a metal nitride layer and a metal oxide layer in the coating layer has the effect of enhancing the insulating property of the coating layer. Likewise, the combination of a metal nitride layer and a metal oxynitride layer in the coating layer has the effect of enhancing the resistances to gas permeability and water vapor permeability.

Preferred examples of the metal oxide which forms the metal oxide layer include silicon oxide, titanium oxide, beryllium oxide, aluminum oxide, zirconium oxide, barium oxide, calcium oxide, cerium oxide, cobalt oxide, chromium oxide, copper oxide, iron oxide, gallium oxide, hafnium oxide, holonium oxide, indium oxide, lanthanum oxide, niobium oxide, tin oxide, thallium oxide, tungsten oxide, etc. They may be used singly or in combination of two or more. They may be partially reacted with other elements in the metal oxide layer to synthesize another compound or alloy. Among them, preferred are silicon oxide, titanium oxide, beryllium oxide, aluminum oxide and zirconium oxide because they have excellent stability particularly at high temperatures and no electronic conductivity.

The metal oxide layer preferably has a thickness of 0.1 to 5 μm. If the thickness is too thin, the effect of enhancing the insulating property of the coating layer will be small. In contrast, if the thickness is too thick, the energy density of the battery will be reduced.

Preferred examples of the metal oxynitride which forms the metal oxynitride layer include aluminum oxynitride, silicon oxynitride and zirconium oxynitride. They may be used singly or in combination of two or more. They may be partially reacted with other elements in the metal oxynitride layer to synthesize another compound or alloy.

The metal oxynitride layer preferably has a thickness of 0.1 to 5 μm. If the thickness of the metal oxynitride layer is too thin, the effect of enhancing the resistances to gas permeability and water vapor permeability will be reduced. On the other hand, if the thickness is too thick, the energy density of the battery will be reduced.

These layers constituting the coating layer can be produced by processes such as sputtering, ion plating, CVD (chemical vapor deposition), heat deposition, sol-gel transfer, plating, etc. The details of the production processes are well known to those skilled in the art.

In the case of forming, on the substrate, the coating layer comprising two layers including a metal nitride layer, it is preferred to first form a metal nitride layer on the substrate, and then a metal oxide layer or metal oxynitride layer on the metal nitride layer since the effect of preventing oxygen from reaching the substrate is enhanced.

In the case of forming, on the substrate, the coating layer comprising three or more layers including a metal nitride layer, the presence of at least one metal nitride layer prevents the embrittlement-of the substrate caused by oxidation. However, it is preferred that a plurality of the metal nitride layers are formed on the substrate, but not successively. In this case also, it is preferred to first form a metal nitride layer on the substrate.

Figure 1:
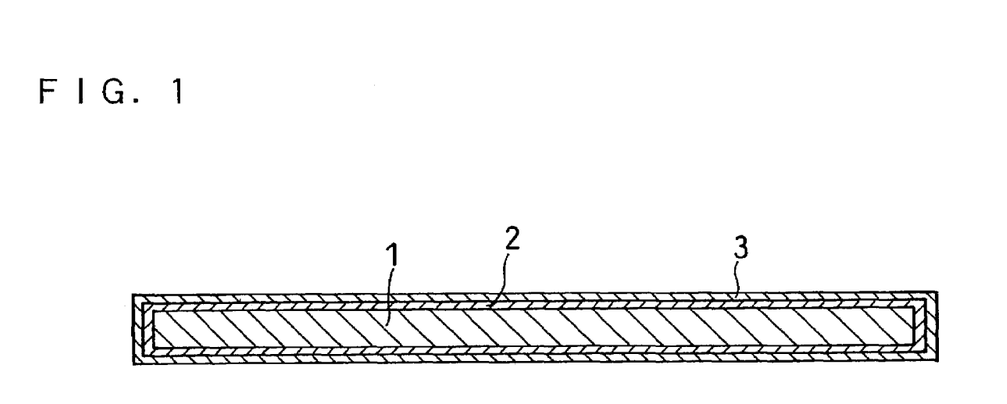
FIG. 1 is a vertical sectional view of one embodiment of a substrate in accordance with the present invention.
Figure 2:
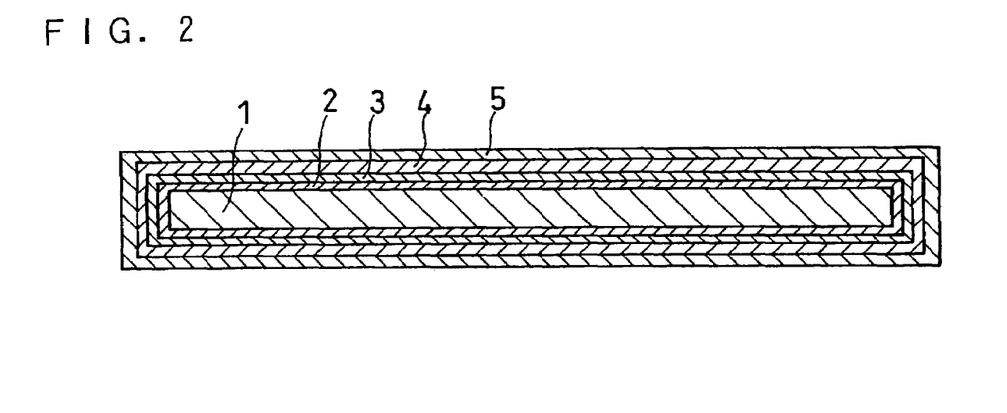
FIG. 2 is a vertical sectional view of another embodiment of a substrate in accordance with the present invention.
Figure 3A:
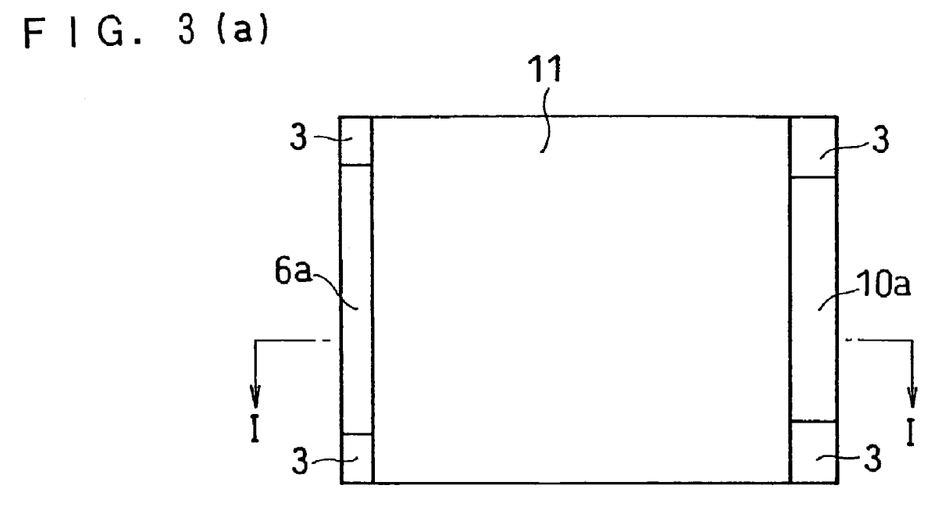
FIG. 3(a) is a top view of an all solid state lithium battery in accordance with the present invention.
Figure 3B:
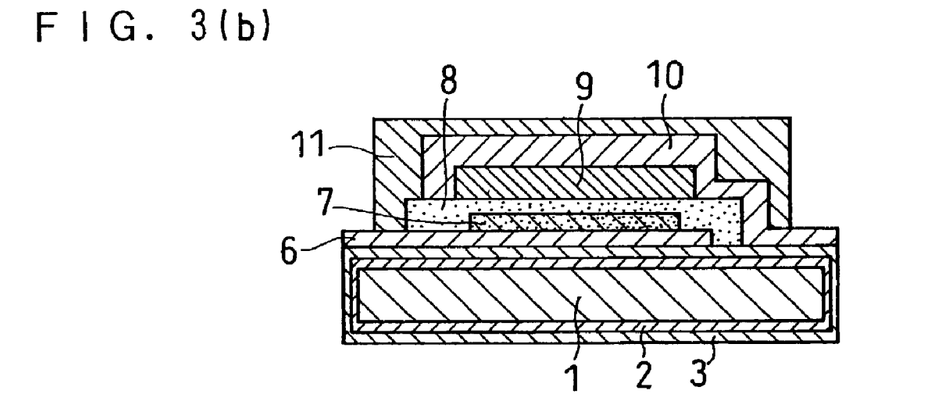
FIG. 3(b) is a sectional view taken on line I—I in FIG. 3(a).
Figure 4:
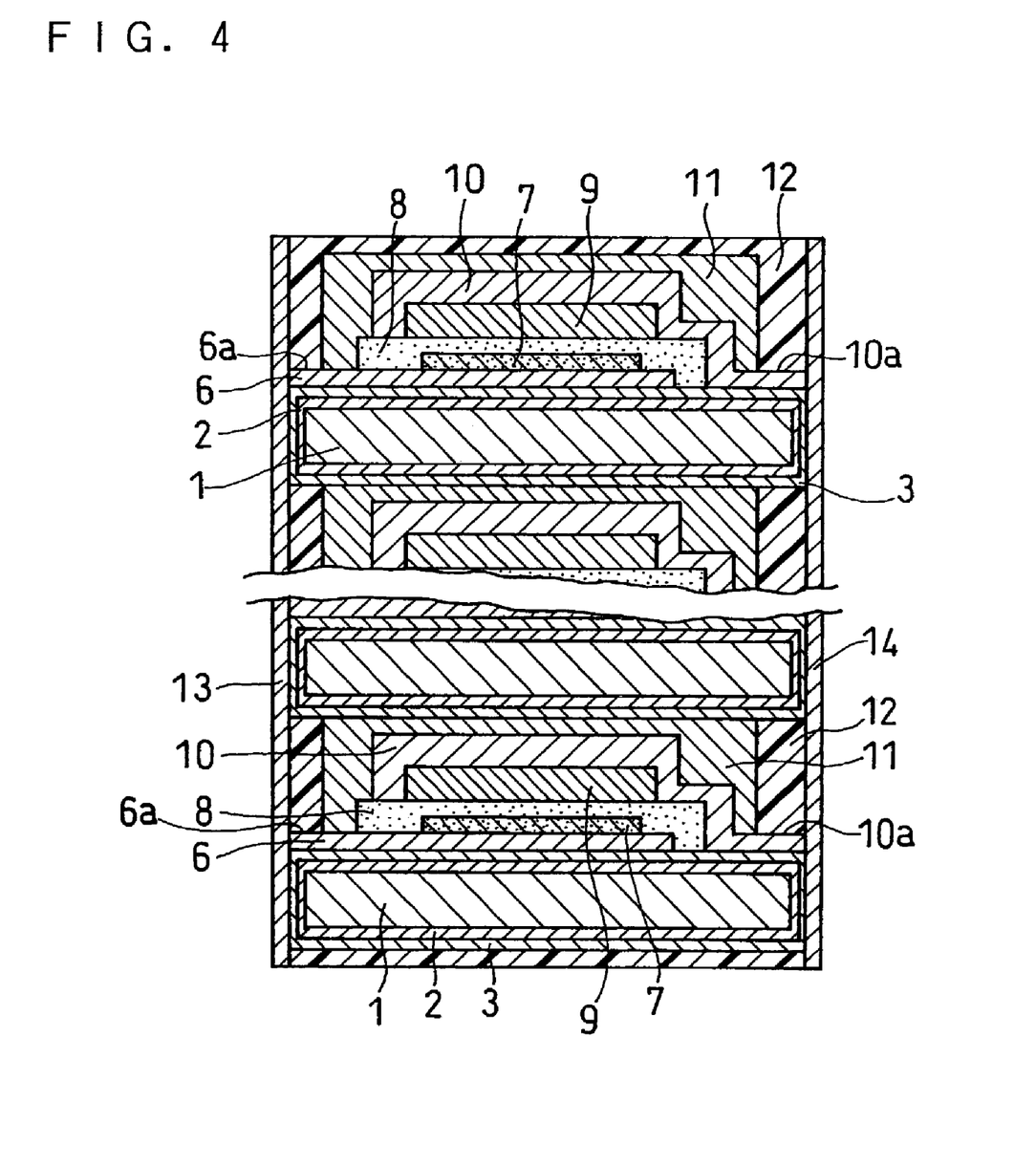
FIG. 4 is a vertical sectional view of a stacked all solid state lithium battery constructed by stacking a plurality of all solid state lithium batteries in accordance with the present invention.

Next, the process of producing the all solid state lithium battery, which is one embodiment of the all solid state batteries in accordance with the present invention, is described referring to FIGS. 1 to 4. FIG. 1 is a vertical sectional view of one embodiment of a substrate used for the present invention. FIG. 2 is a vertical cross sectional view of another embodiment of a substrate used for the present invention. FIG. 3(a) is a top view of an all solid state lithium battery in accordance with the present invention, and FIG. 3(b) is a sectional view taken on line I—I in FIG. 3(a). FIG. 4 is a vertical sectional view of a stacked all solid state lithium battery constructed by stacking a plurality of all solid state lithium batteries in accordance with the present invention.

(i) Preparation of Substrate

As shown in FIG. 1, a metal nitride layer 2 is preferably formed on both sides of a metal sheet 1. In the case where it is necessary to further enhance insulating property, a metal oxide layer 3 is further formed on the metal nitride layer 2. In the case where the time of heat treatment which is to be carried out later is long or where the concentration of oxygen in a heat treating atmosphere is high, it is preferred to repeatedly form a second metal nitride layer 4 and a second metal oxide layer 5, etc on the metal oxide layer 3, as shown in FIG. 2. Additionally, instead of the metal oxide layers, metal oxynitride layers can be formed, and it is also possible to form a metal oxide layer and a metal oxynitride layer in arbitrary order on the metal nitride layer.

(ii) Preparation of Positive Electrode Current Collector Layer

A positive electrode current collector layer 6 is formed on the substrate produced above. The positive electrode current collector layer is formed such that the layer is extended to one side edge of the substrate as shown in FIGS. 3(a) and (b), allowing the extended portion to serve as a positive electrode terminal connection part 6a. Materials used for the positive electrode current collector layer include electron-conductive materials such as gold, platinum, titanium, chromium, cobalt, copper, iron, aluminum, indium oxide, tin oxide, indium tin oxide (ITO), etc. In the case where the time of heat treatment which is to be carried out later is long or where the concentration of oxygen in a heat treating atmosphere is high, it is preferred to use gold, platinum, indium oxide, tin oxide, indium tin oxide.

The positive electrode current collector typically has a thickness of 0.1 to 5 µm, but the thickness is not limited to that range.

(iii) Preparation of Positive Electrode Active Material Layer

A positive electrode active material layer 7 is formed on the positive electrode current collector layer 6. Materials used for the positive electrode active material layer include lithium cobaltate, lithium nickelate, lithium manganate or compounds produced by partially replacing the transition elements of the aforesaid compounds with other elements, lithium iron phosphate, lithium cobalt phosphate, banadium oxide, etc. They may be used singly or in combination of two or more. Among them, particularly preferred are lithium cobaltate, lithium nickelate, lithium manganate or compounds formed by partially replacing the transition elements of the aforesaid compounds with other elements. In order to obtain excellent electrochemical characteristics, the active material layer is required to be annealed at 600 to 1000° C. for 0.5 to 24 hours in an atmosphere containing oxygen to increase the crystallinity of the formed positive electrode active material layer.

The positive electrode active material layer typically has a thickness of 0.1 to 5 µm, but the thickness is not limited to that range.

(iv) Preparation of Solid Electrolyte Layer

A solid electrolyte layer 8 is formed on the positive electrode active material layer 7. Materials used for the solid electrolyte layer include nitrogen-doped $Li_3PO_4$ such as $Li_{3.3}PO_{3.8}NO_{0.22}$, $Li_3PO_4$—$Li_4SiO_4$, $Li_2O$—$SiO_2$, $Li_2O$—$P_2O_5$, $Li_2O$—$B_2O_3$, $Li_2O$—$GeO_2$, $Li_2S$—$SiS_2$, $Li_2S$—$P_2S_5$, $Li_2S$—$B_2S_3$ and $Li_2S$—$GeS_2$. They may be used singly or in combination of two or more. It is also possible to add lithium halide such as LiI or lithium oxyacid salt such as $Li_3PO_4$, $LiPO_3$, $Li_4SiO_4$, $Li_2SiO_3$ or $LiBO_2$ to the aforementioned compounds. In order to enlarge the reaction area, it is preferred that the solid electrolyte layer 8 completely covers the positive electrode active material layer 7.

The solid electrolyte layer typically has a thickness of 0.1 to 3 µm, but the thickness is not limited to that range.

(v) Preparation of Negative Electrode Active Material Layer

A negative electrode active material layer 9 is formed to face the positive electrode active material layer 7 with the solid electrolyte layer 8 interposed therebetween. The negative electrode active material layer 9 is preferably larger than the positive electrode active material layer 7 and smaller than the solid electrolyte layer 8 when seen from the top view. Because this reduces the current density of the negative electrode active material layer to suppress the formation of lithium dendrite on the negative electrode active material layer, thus preventing short circuits.

Materials used for the negative electrode active material layer include metallic lithium, graphite, carbonaceous materials, lithium titanate, titanium sulfide, lithium nitrides such as $Li_{2.6}Co_{0.4}N$, $Li_{4.4}Si$, alloys capable of absorbing and desorbing lithium ions, etc.

The negative electrode active material layer typically has a thickness of 0.1 to 5 µm, but the thickness is not limited to that range.

(vi) Preparation of Negative Electrode Current Collector

A negative current collector layer 10 is formed on the negative electrode active material layer 9. The negative electrode current collector layer is formed such that the layer is extended to another side edge of the substrate (i.e. the side edge opposite to the positive electrode terminal connection part 6a as shown in FIG. 3(a)). The extended portion serves as a negative electrode terminal connection part 10a. Materials used for the negative electrode current collector layer include gold, platinum, titanium, chromium, cobalt, indium oxide, tin oxide, ITO, etc. In the case where the time of heat treatment which is to be carried out later is long or where the concentration of oxygen in a heating-treatment atmosphere is high, gold, platinum, indium oxide, tin oxide and ITO are particularly preferred.

The negative electrode current collector layer typically has a thickness of 0.1 to 5 µm, but the thickness is not limited to that range.

(vii) Preparation of Protective Layer

After the negative electrode current collector layer is formed, a protective layer 11 is preferably provided in order to protect the battery comprising different layers. The protective layer can be made of any insulating material without electron conductivity such as resin or glass.

The positive electrode current collector layer, the positive electrode active material layer, the solid electrolyte layer, the negative electrode active material layer, the negative electrode current collector layer and the protective layer can be formed, on the substrate, by processes such as sputtering, ion-plating, CVD, heat deposition, sol-gel transfer, plating, etc, but not limited to these processes. Any process for forming layers can be used.

It is to be noted that, herein, the positive electrode current collector layer, the positive electrode active material layer, the solid electrolyte layer, the negative electrode active material layer, the negative electrode current collector layer are formed on the substrate in this order, but they can be formed in reverse order; specifically, on the substrate are formed the negative electrode current collector layer, the negative electrode active material layer, the solid electrolyte layer, the positive electrode active material layer and the positive electrode current collector layer.

A plurality of thus obtained batteries may be stacked as shown in FIG. 4. A sealing material 12 made of insulating material such as glass or ceramics may be applied on the faces of the stack of the batteries to obtain an insulated and stacked all solid state lithium battery with a high capacity or high voltage. Then, the predetermined sides of the all solid state lithium battery covered with the sealing material are cut and polished, whereby the positive electrode terminal connection part 6a guided from the positive electrode current collector layer and the negative electrode terminal connection part 10a guided from the negative electrode current collector layer expose to the sides respectively. A film made of platinum is formed on each of the sides to cover the exposed parts so that they serve as a positive electrode terminal 13 and a negative electrode terminal 14, respectively.

Examples of the resin used for the sealing material include epoxy resins, phenol resins, urea resins, melamine resins, unsaturated polyester resins, polyimide resins, polyethylene, polystyrene, polypropylene, polyphenylene sulfide, polyparaxylylene, liquid crystal polymers, which are widely employed for semiconductor devices. They may be used singly or in combination of two or more. Additionally, their derivatives and resin compositions obtained by mixing the aforementioned resins with other materials such as a filler may also be used.

The processes for sealing the battery with the resin include injection molding, transfer molding, dip molding, etc.

Examples of the glass used for the sealing material include soda-lime glass, lead-soda glass, lead-potash glass, alumino-silicate glass, tungsten glass, molybdenum glass, glass for Koval (trade name; manufactured by Westinghouse Electric & Manufacturing Company) manufactured by Nippon Electric Glass Co., Ltd., uranium glass, Telex manufactured by Asahi Techno Glass Corporation, Vycor manufactured by Corning Incorporated, glass for sealing such as quartz glass. It is preferred to use glass materials having nearly the same heat expansion coefficient as the materials for the electrode terminal.

Examples of the ceramics for the sealing material include metal oxides such as aluminum oxide, zirconium oxide and silicon oxide, and metal nitrides such as boron nitride.

The processes for sealing the battery with the glass or ceramics include dip molding, sputtering, ion-plating, CVD, heat deposition, sol-gel transfer, plating, etc, but not limited to them. The sealing material obtained by these processes can be crystalline or amorphous.

The following describes the present invention based on examples, but the present invention is not limited to them.

EXAMPLE 1

First, a titanium nitride layer serving as the metal nitride layer with a thickness of 2 μm was formed on both surfaces of a copper foil with a thickness of 10 μm, a width of 15 mm and a length of 25 mm by RF magnetron sputtering. On the titanium nitride layer, a $SiO_2$ layer with a thickness of 2 μm was then formed by the analogous process to serve as the metal oxide layer. Thus, a substrate comprising a coating layer comprising titanium nitride layer and $SiO_2$ layer was obtained.

Subsequently, on the $SiO_2$ layer, a platinum layer with a thickness of 0.5 μm, a width of 12 mm and a length of 20 mm was formed by RF magnetron sputtering to serve as the positive electrode current collector layer. The positive electrode current collector layer was located along one side edge of the substrate as shown in FIG. 3(a) to form a positive electrode terminal connection part.

On the positive electrode current collector, a lithium cobaltate layer with a thickness of 1 μm, a width of 10 mm and a length of 10 mm was formed by RF magnetron sputtering to serve as the positive electrode active material layer. After the positive electrode active material layer was formed, it was annealed at 800° C. in an air atmosphere for 5 hours.

After annealing, a lithium ion conductive solid electrolyte layer with a thickness of 1 μm, a width of 14 mm and a length of 14 mm was formed on the positive electrode active material layer by RF magnetron sputtering. The lithium ion conductive solid electrolyte layer was formed using, as the target, a pressure-molded solid electrolyte glass powder ($0.63Li_2S$-$0.36SiS_2$-$0.01Li_3PO_4$). In the formula, the factors of compounds (i.e. 0.63, 0.36 and 0.01) represent the molar ratio of the compounds contained in the powdered solid electrolyte glass.

Furthermore, on the solid electrolyte layer, a metallic lithium layer with a thickness of 3 μm, a width of 11 mm and a length of 11 mm was formed by resistance heating deposition to serve as the negative electrode active material layer.

A platinum layer serving as the negative electrode current collector layer with a thickness of 0.5 μm, a width of 12 mm and a length of 20 mm was formed completely covering the metallic lithium layer by DC magnetron sputtering. At this time, the platinum layer should be positioned not to overlap the positive electrode terminal connection part of the positive electrode current collector layer. The negative electrode current collector layer was located along another side edge of the substrate (i.e. the side edge opposite to the positive electrode terminal connection part), as shown in FIG. 3(a), to form a negative electrode terminal connection part. Thus, a power-generating element of all solid state lithium battery was obtained.

An alumina layer with a thickness of 3 μm, was formed covering the negative electrode current collector by RF magnetron sputtering on the whole top face of the power-generating element except the positive and negative electrode terminal connection parts to give a 27 μm-thick all solid state lithium battery.

The obtained all solid state lithium battery was charged at a constant current of 1 μA up to 4.3 V, and then discharged at 1 μA down to 3 V. The discharge capacity at this time was 76 μAh and the average working voltage was 3.9 V. This indicates that the all solid state lithium battery of this example has a volume energy density of 29 mWh/cc.

COMPARATIVE EXAMPLE 1

A lithium cobaltate layer with a thickness of 1 μm, a width of 10 mm and a length of 10 mm was directly formed on a copper foil with a thickness of 10 μm, a width of 15 mm and a length of 25 mm by RF magnetron sputtering; incidentally, a titanium nitride layer and a $SiO_2$ layer were not formed. After the positive electrode active material layer was prepared, it was annealed at 800° C. in an air atmosphere for 5 hours in order to enhance the crystallinity of lithium cobaltate.

The substrate copper foil with the positive electrode active material layer was removed from a tubular furnace used for annealing and the copper foil was then checked and found to be brittle; therefore, it was impossible to subject the substrate to the subsequent steps including forming of the solid electrolyte layer.

COMPARATIVE EXAMPLE 2

Similar to COMPARATIVE EXAMPLE 1, a lithium cobaltate layer serving as the positive electrode active material layer with a thickness of 1 μm, a width of 10 mm and a length of 10 mm was directly formed on a stainless steel foil with a thickness of 10 μm, a width of 15 mm and a length of 25 mm, instead of on a copper foil, by RF magnetron sputtering. After the positive electrode active material layer was prepared, it was annealed at 800° C. in an air atmosphere for 5 hours in order to enhance the crystallinity of the lithium cobaltate.

The substrate stainless steel foil with the positive electrode active material layer was removed from a tubular furnace used for annealing and the stainless steel foil was checked and found to be brittle; therefore, it was impossible to subject the substrate to the subsequent steps including forming of the solid electrolyte layer.

COMPARATIVE EXAMPLE 3

Only a $SiO_2$ layer with a thickness of 2 μm was formed on a copper foil with a thickness of 10 μm, a width of 15 mm and a length of 25 mm; incidentally, a titanium nitride layer was not formed. On the $SiO_2$ layer, a lithium cobaltate layer with a thickness of 10 μm, a width of 10 mm and a length of 10 mm was formed to serve as the positive electrode active material layer. After the positive electrode active material layer was prepared, it was annealed at 800° C. in an air atmosphere 5 hours in order to enhance the crystallinity of lithium cobaltate.

The substrate copper foil with the $SiO_2$ layer and the positive electrode active material layer was removed from a tubular furnace used for annealing and the copper foil was checked and found to be brittle; therefore, it was impossible to subject the substrate to the subsequent steps including forming of the solid electrolyte layer.

COMPARATIVE EXAMPLE 4

An all solid state lithium battery was fabricated in the same manner as in EXAMPLE 1 except that a silicon wafer with a thickness of 0.3 mm, a width of 15 mm and a length of 25 mm was used instead of the copper foil substrate having a titanium nitride layer and $SiO_2$ layer. The obtained all solid state lithium battery had a thickness of 317 μm.

The all solid state lithium battery was charged at a constant current of 1 μA up to 4.3 V, and then discharged at 1 μA down to 3 V. The discharge capacity at this time was 76 μAh and the average working voltage was 3.9 V. This indicates that the all solid state lithium battery of this comparative example has a volume energy density of 2.5 mWh/cc.

EXAMPLE 2

An all solid state lithium battery was fabricated in the same manner as in EXAMPLE 1 except that, in the coating layer, a 2 μm-thick aluminum nitride layer was formed instead of the 2 μm-thick titanium nitride layer and a 2 μm-thick titanium oxide layer was formed instead of the 2 μm-thick $SiO_2$ layer. The obtained all solid state lithium battery had a thickness of 27 μm and a volume energy density of 29 mWh/cc which was determined in the-same manner as in EXAMPLE 1.

EXAMPLE 3

An all solid state lithium battery was fabricated in the same manner as in EXAMPLE 1 except that, in the coating layer, a 2 μm-thick silicon nitride layer was formed instead of the 2 μm-thick titanium nitride layer and a 2 μm-thick aluminum oxide layer was formed instead of the 2 μm-thick $SiO_2$ layer. The obtained all solid state lithium battery had a thickness of 27 μm and a volume energy density of 29 mWh/cc which was determined in the same manner as in EXAMPLE 1.

EXAMPLE 4

An all solid state lithium battery was fabricated in the same manner as in EXAMPLE 1 except that, in the coating layer, a 2 μm-thick zirconium nitride layer was formed instead of the 2 μm-thick titanium nitride layer and a 2 μm-thick beryllium oxide layer was formed instead of the 2 μm-thick $SiO_2$ layer. The obtained all solid state lithium battery had a thickness of 27 μm and a volume energy density of 29 mWh/cc which was determined in the same manner as in EXAMPLE 1.

EXAMPLE 5

An all solid state lithium battery was fabricated in the same manner as in EXAMPLE 1 except that, in the coating layer, a 2 μm-thick boron nitride layer was formed instead of the 2 μm-thick titanium nitride layer and a 2 μm-thick zirconium oxide layer was formed instead of the 2 μm-thick $SiO_2$ layer. The obtained all solid state lithium battery had a thickness of 27 μm and a volume energy density of 29 mWh/cc which was determined in the same manner as in EXAMPLE 1.

EXAMPLE 6

An all solid state lithium battery was fabricated in the same manner as in EXAMPLE 1 except that a stainless steel foil with a thickness of 10 μm, a width of 15 mm and a length of 25 mm was used instead of the copper foil, and in the coating layer, a 2 μm-thick aluminum nitride layer was formed instead of the 2 μm-thick titanium nitride layer, a 1 μm-thick aluminum oxynitride layer was formed instead of the 2 μm-thick $SiO_2$ layer and a 2 μm-thick aluminum oxide layer was further formed on the aluminum oxynitride layer. The obtained all solid state lithium battery had a thickness of 29 μm and a volume energy density of 27 mWh/cc which was determined in the same manner as in EXAMPLE 1.

EXAMPLE 7

An all solid state lithium battery was fabricated in the same manner as in EXAMPLE 1 except that a stainless steel foil with a thickness of 10 μm, a width of 15 mm and a length of 25 mm was used instead of the copper foil, and in the coating layer, a 2 μm-thick zirconium oxide layer was formed instead of the 2 μm-thick $SiO_2$ layer. The obtained all solid state lithium battery had a thickness of 27 μm and a volume energy density of 29 mWh/cc which was determined in the same manner as in EXAMPLE 1.

EXAMPLE 8

An all solid state lithium battery was fabricated in the same manner as in EXAMPLE 1 except that a stainless steel foil with a thickness of 10 μm, a width of 15 mm and a length of 25 mm was used instead of the copper foil, and in the coating layer, a 1 μm-thick silicon nitride layer was formed instead of the 2 μm-thick titanium nitride layer, a 1 μm-thick silicon oxynitride layer was formed instead of the 2 μm-thick $SiO_2$ layer and a 1 μm-thick silicon oxide layer was further formed on the silicon oxynitride layer. The obtained all solid state lithium battery had a thickness of 25 μm and a volume energy density of 32 mWh/cc which was determined in the same manner as in EXAMPLE 1.

EXAMPLE 9

An all solid state lithium battery was fabricated in the same manner as in EXAMPLE 1 except that a stainless steel foil with a thickness of 10 μm, a width of 15 mm and a length of 25 mm was used instead of the copper foil, and in the coating layer, a 1 μm-thick silicon nitride layer was formed instead of the 2 μm-thick titanium nitride layer, a 1 μm-thick silicon oxynitride layer was formed instead of the 2 μm-thick $SiO_2$ layer and a 1 μm-thick zirconium oxide layer was further formed on the silicon oxynitride layer. The obtained all solid state lithium battery had a thickness of 25 μm and a volume energy density of 32 mWh/cc which was determined in the same manner as in EXAMPLE 1.

EXAMPLE 10

An all solid state lithium battery was fabricated in the same manner as in EXAMPLE 1 except that a stainless steel foil with a thickness of 10 μm, a width of 15 mm and a length of 25 mm was used instead of the copper foil, and in the coating layer, a 1 μm-thick boron nitride layer was formed instead of the 2 μm-thick titanium nitride layer, a 1 μm-thick beryllium oxide layer was formed instead of the 2 μm-thick $SiO_2$ layer, a 1 μm-thick silicon nitride layer was further formed on the beryllium oxide layer and a 1 μm-thick aluminum oxide layer was still further formed on the silicon nitride layer. The obtained all solid state lithium battery had a thickness of 27 μm and a volume energy density of 29 mWh/cc which was determined in the same manner as in EXAMPLE 1.

EXAMPLE 11

An all solid state lithium battery was fabricated in the same manner as in EXAMPLE 1 except that, in the coating layer, a 2 μm-thick silicon nitride layer was formed instead of the 2 μm-thick titanium nitride layer, a 2 μm-thick silicon oxynitride layer was formed instead of the 2 μm-thick $SiO_2$ layer. The obtained all solid state lithium battery had a thickness of 27 μm and a volume energy density of 29 mWh/cc which was determined in the same manner as in EXAMPLE 1.

EXAMPLE 12

An all solid state lithium battery was fabricated in the same manner as in EXAMPLE 1 except that, in the coating layer, a 2 μm-thick zirconium nitride layer was formed instead of the 2 μm-thick titanium nitride layer and a 2 μm-thick zirconium oxynitride layer was formed instead of the 2 μm-thick $SiO_2$ layer. The obtained all solid state lithium battery had a thickness of 27 μm and a volume energy density of 29 mWh/cc which was determined in the same manner as in EXAMPLE 1.

Table 1 shows the composition of the substrates and the thickness and volume energy density of the all solid state lithium batteries. It is to be noted that, in all above examples, the metallic lithium layer was fabricated by resistance heating deposition, the platinum layer was formed by DC magnetron sputtering and other layers were prepared by RF magnetron sputtering.

TABLE 1

| Example | Metal foil | First layer | Second layer | Third layer | Forth layer | Thickness of unit battery (μm) | Volume energy density (mWh/cc) |
|---|---|---|---|---|---|---|---|
| 1 | Copper 10 μm | Titanium nitride 2 μm | Silicon oxide 2 μm | — | — | 27 μm | 29 |
| 2 | Copper 10 μm | Aluminum nitride 2 μm | Titanium oxide 2 μm | — | — | 27 μm | 29 |
| 3 | Copper 10 μm | Silicon nitride 2 μm | Aluminum oxide 2 μm | — | — | 27 μm | 29 |
| 4 | Copper 10 μm | Zirconium nitride 2 μm | Beryllium oxide 2 μm | — | — | 27 μm | 29 |
| 5 | Copper 10 μm | Boron nitride 2 μm | Zirconium oxide 2 μm | — | — | 27 μm | 29 |
| 6 | Stainless steel 10 μm | Aluminum nitride 2 μm | Aluminum oxynitride 1 μm | Aluminum oxide 2 μm | — | 29 μm | 27 |
| 7 | Stainless steel 10 μm | Titanium nitride 2 μm | Zirconium oxide 2 μm | — | — | 27 μm | 29 |
| 8 | Stainless steel 10 μm | Silicon nitride 1 μm | Silicon oxynitride 1 μm | Silicon oxide 1 μm | — | 25 μm | 32 |
| 9 | Stainless steel 10 μm | Silicon nitride 1 μm | Silicon oxynitride 1 μm | Zirconium oxide 1 μm | — | 25 μm | 32 |
| 10 | Stainless steel 10 μm | Boron nitride 1 μm | Beryllium oxide 1 μm | Silicon nitride 1 μm | Aluminum oxide 1 μm | 27 μm | 29 |
| 11 | Copper 10 μm | Silicon nitride 2 μm | Silicon oxynitride 2 μm | | | 27 μm | 29 |

TABLE 1-continued

| Example | Metal foil | First layer | Second layer | Third layer | Forth layer | Thickness of unit battery (μm) | Volume energy density (mWh/cc) |
|---------|------------|-------------|--------------|-------------|-------------|-------------------------------|-------------------------------|
| 12 | Copper 10 μm | Zirconium nitride 2 μm | Zirconium oxynitride 2 μm | | | 27 μm | 29 |

EXAMPLE 13

Twenty of the all solid state lithium batteries fabricated in EXAMPLE 1 were stacked as shown in FIG. 4. The obtained stack was covered with a 0.5 mm-thick epoxy resin layer, and the positive electrode terminal connection part disposed side and the negative electrode terminal connection part disposed side were cut and polished to allow the positive and negative electrode terminal connection parts to be exposed to the sides, respectively. A platinum film was formed on each of the exposed sides by DC magnetron sputtering so that the films respectively serve as the positive electrode terminal 13 and the negative electrode terminal 14. The stacked battery thus obtained had a size of 16 mm×26 mm×1.54 mm.

The battery was charged at a constant current of 10 μA up to 4.3 V, and then discharged at 10 μA down to 3 V. The discharge capacity at this time was 1520 μAh and the average working voltage was 3.9 V. This indicates that the obtained stacked battery has a volume energy density of 9.3 mWh/cc.

COMPARATIVE EXAMPLE 5

A stacked battery was constructed in the same manner as in EXAMPLE 13 except that the all solid state lithium batteries produced in COMPARATIVE EXAMPLE 4 were used instead of those in EXAMPLE 1. The stacked battery thus obtained had a size of 16 mm×26 mm×7.34 mm.

The stacked battery was charged at a constant current of 10 μA up to 4.3 V, and then discharged at 10 μA down to 3 V. The discharge capacity at this time was 1520 μAh and the average working voltage was 3.9 V. This indicates that the obtained stacked battery has a volume energy density of 1.9 mWh/cc.

The examples has revealed, according to the present invention, that it is possible to reduce the volume of the substrate of the all solid state battery since a thinner substrate than conventional ones can be employed and to significantly improve the volume energy density of the all solid state battery.

Although the above examples used lithium cobaltate as the positive electrode active material layer, metallic lithium as the negative electrode active material layer, and $0.63Li_2S$-$0.36SiS_2$-$0.01Li_3PO_4$ as the solid electrolyte, it is to be understood that the all solid state battery of the present invention is not limited to those made of the aforesaid materials. Likewise, the number of batteries in the stacked battery is not limited to that of the above examples. Regarding the process of preparing films, although the above examples employed RF magnetron sputtering, etc, it is possible to use any process known as method of forming a thin film such as other sputtering processes, ion plating method, CVD method, heat deposition method, sol-gel method, plating method, etc, and it is not limited to the processes described in the above examples.

As described above, since the all solid state battery of the present invention can use a thin substrate, it is possible to reduce the volume of substrate of the all solid state battery, thus significantly improving the volume energy density of the all solid state battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An all solid state battery comprising:
   (a) a positive electrode current collector layer,
   (b) a positive electrode active material layer carried on said positive electrode current collector layer,
   (c) a negative electrode current collector layer,
   (d) a negative electrode active material layer carried on said negative electrode current collector layer,
   (e) a solid electrolyte layer interposed between said positive and negative electrode active material layers, and
   (f) a substrate carrying either of said positive and negative electrode current collector layers,
   said substrate comprising a metal sheet and a coating layer covering the surface of said metal sheet, said coating layer comprising at least one metal nitride layer,
   wherein said coating layer covering the surface of said metal sheet is in direct contact with said metal sheet.

2. The all solid state battery in accordance with claim 1, wherein said coating layer further comprises at least one metal oxide layer.

3. The all solid state battery in accordance with claim 1, wherein said coating layer further comprises at least one metal oxynitride layer.

4. The all solid state battery in accordance with claim 1, wherein said coating layer further comprises at least one metal oxide layer and at least one metal oxynitride layer.

5. The all solid state battery in accordance with claim 1, wherein said metal nitride layer comprises at least one selected from the group consisting of titanium nitride, aluminum nitride, silicon nitride, boron nitride and zirconium nitride.

6. The all solid state battery in accordance with claim 2, wherein said metal oxide layer comprises at least one selected from the group consisting of silicon oxide, titanium oxide, beryllium oxide, aluminum oxide and zirconium oxide.

7. The all solid state battery in accordance with claim 4, wherein said metal oxide layer comprises at least one selected from the group consisting of silicon oxide, titanium oxide, beryllium oxide, aluminum oxide and zirconium oxide.

8. The all solid state battery in accordance with claim 3, wherein said metal oxynitride layer comprises at least one selected from the group consisting of aluminum oxynitride, silicon oxynitride and zirconium oxynitride.

9. The all solid state battery in accordance with claim 4, wherein said metal oxynitride layer comprises at least one selected from the group consisting of aluminum oxynitride, silicon oxynitride and zirconium oxynitride.

10. The all solid state battery in accordance with claim 1, wherein said metal sheet comprises copper, nickel, iron, a copper alloy, a nickel alloy, an iron alloy or a stainless steel.

* * * * *